United States Patent [19]

Ueda et al.

[11] Patent Number: 5,677,051
[45] Date of Patent: Oct. 14, 1997

[54] MAGNETIC RECORDING MEDIUM HAVING A SPECIFIED PLASMA POLYMERIZED HYDROGEN CONTAINING CARBON FILM AND LUBRICANT

[75] Inventors: Kunihiro Ueda, Saku; Masatoshi Nakayama, Sakura; Kiyoshi Yazu, Hodonoharano-machi; Koji Kobayashi, Miyota-machi; Hiromichi Kanazawa, Saku, all of Japan

[73] Assignee: TDK Corporation, Tokyo, Japan

[21] Appl. No.: 651,902

[22] Filed: May 21, 1996

Related U.S. Application Data

[63] Continuation-in-part of Ser. No. 350,070, Nov. 29, 1994, abandoned.

[30] Foreign Application Priority Data

| Nov. 30, 1993 | [JP] | Japan | 5-299682 |
| Nov. 30, 1993 | [JP] | Japan | 5-299683 |

[51] Int. Cl.$^6$ ............................................. G11B 5/66
[52] U.S. Cl. ............ 428/336; 428/408; 428/446; 428/457; 428/422; 428/694 TZ; 428/694 TC; 428/694 TF; 428/900; 427/122; 427/131; 427/249; 427/577; 427/578; 427/585
[58] Field of Search ........................... 428/336, 408, 428/446, 457, 694 TZ, 694 TC, 900, 422, 694 TF; 427/122, 131, 249, 577, 578, 585

[56] References Cited

U.S. PATENT DOCUMENTS

| 4,693,799 | 9/1987 | Yanagihara et al. | 204/165 |
| 4,892,789 | 1/1990 | Nakayama et al. | 428/336 |
| 4,925,733 | 5/1990 | Imataki et al. | 428/336 |
| 5,073,785 | 12/1991 | Jansen et al. | 346/1.1 |
| 5,182,132 | 1/1993 | Murai et al. | 427/577 |
| 5,232,791 | 8/1993 | Kohler et al. | 428/694 |
| 5,266,409 | 11/1993 | Schmidt et al. | 428/446 |
| 5,275,850 | 1/1994 | Kitoh et al. | 427/577 |
| 5,320,875 | 6/1994 | Hu et al. | 427/493 |
| 5,330,852 | 7/1994 | Gerstenberg et al. | 428/694 DE |
| 5,352,493 | 10/1994 | Dorfman et al. | 427/530 |
| 5,543,203 | 8/1996 | Tani et al. | 428/156 |

FOREIGN PATENT DOCUMENTS

| 57-135443 | 8/1982 | Japan . |
| 57-164432 | 10/1982 | Japan . |
| 3-53691 | 8/1991 | Japan . |
| 4-341918 | 11/1992 | Japan . |
| 5-20663 | 1/1993 | Japan . |
| 5-33456 | 5/1993 | Japan . |

OTHER PUBLICATIONS

*McGraw-Hill Encyclopedia of Science & Technology*, 7th. edition, McGraw-Hill, Inc., New York, 1992.
*Van Nostrand's Scientific Encyclopedia*, 8th. edition, Van Nostrand Reinhold, New York, 1995.
*Dictionary of Physics*, edited by John Daintith, Barnes & Noble Books, 1981.

*Primary Examiner*—Stevan A. Resan
*Attorney, Agent, or Firm*—Stephen F. K. Yee

[57] ABSTRACT

A magnetic recording medium possessing excellent electromagnetic characteristics, corrosion resistance, durability, abrasion resistance and lubricity, has an undercoat layer, a ferromagnetic metal layer, a protective layer and a lubricating layer formed in this order on a non-magnetic substrate, or has an undercoat layer, a ferromagnetic metal layer, an intercepting layer, a protective layer and a lubricating layer formed in this order on a non-magnetic substrate, wherein the protective layer is a plasma-polymerized hydrogen-containing carbon film having a refractive index of 1.90 or more and a contact angle of less than 80 degrees, the film thickness of the protective layer or the total film thickness of the protective layer and the intercepting layer is 30 to 150 Å, the undercoat layer, as well as the intercepting layer, is a film formed of silicon oxide represented by $SiO_x$ ($x=1.8–1.95$), and the lubricating layer is formed of a compound selected from the group consisting of polar perfluoropolyethers, non-polar perfluoropolyethers, perfluorocarboxylic acids, phosphazens, perfluoroalkylates and perfluoroacrylate compounds; and a method for producing the recording medium.

7 Claims, 1 Drawing Sheet

MAGNETIC RECORDING MEDIUM HAVING A SPECIFIED PLASMA POLYMERIZED HYDROGEN CONTAINING CARBON FILM AND LUBRICANT

CROSS REFERENCE TO RELATED APPLICATION

This application is a continuation-in-part of application Ser. No. 08/350,070, filed on Nov. 29, 1994 now abandoned.

BACKGROUND OF THE INVENTION

1. Field of the Invention

The present invention relates to a magnetic recording medium and a method for producing the same, and more particularly to a magnetic recording medium in which a ferromagnetic metal layer serves as a magnetic layer, the ferromagnetic metal layer having improved corrosion resistance, durability, abrasion resistance and lubricity, and a method for its production.

2. Background Art

Magnetic recording media in which ferromagnetic metal layers serve as magnetic layers have excellent characteristics, such as high saturation magnetic flux density and coercive force.

Previously, various magnetic recording media and methods for their production have been proposed to improve the corrosion resistance, durability, abrasion resistance and lubricity of the magnetic recording media in which the ferromagnetic metal layers serve as the magnetic layers.

For example, Japanese Patent Unexamined Publication No. 4-341918 discloses a magnetic recording medium in which a ferromagnetic metal thin film serves as a magnetic layer, the magnetic recording medium comprising a non-magnetic resin substrate, an undercoat layer, a ferromagnetic metal film and a topcoat layer, the undercoat layer and the topcoat layer each containing C and H, and being plasma-polymerized films having a refractive index of 1.8 or more. Japanese Patent Unexamined Publication No. 5-20663 discloses a magnetic recording medium in which the undercoat layer is a plasma-polymerized film containing Si or Si and O, and the topcoat layer is a plasma-polymerized film containing C and H. Japanese Patent Examined Publication No. 5-33456 discloses a magnetic recording medium comprising a substrate, a magnetic layer formed on the substrate and a protective layer formed on the magnetic layer, the protective layer comprising a hard carbon layer and a fluorine-containing lubricating oil layer. Japanese Patent Unexamined Publication No. 57-135443 discloses a magnetic recording medium in which a vapor stream of a magnetic substance is obliquely incident on a surface of a substrate to deposit a magnetic thin film, and immediately thereafter an organic substance is plasma polymerized on the deposited magnetic film to provide an overcoat thin-film layer. Japanese Patent Unexamined Publication No. 57-164432 discloses a magnetic recording medium in which an organic polymer layer is formed on an oblique deposition type metal magnetic layer and a higher fatty acid or ester layer is formed thereon, the organic polymer layer and the higher fatty acid or ester layer each being formed by vacuum deposition, ion plating, sputtering or plasma polymerization. Japanese Patent Examined Publication No. 3-53691 discloses a magnetic recording medium in which a surface of a magnetic layer is coated with a plasma-polymerized thin film having siloxane bonds and a thickness of 5 to 1000 Å.

However, for the prior-an magnetic recording media described in Japanese Patent Unexamined Publication Nos. 4-341918 and 5-20663, the protective layers have insufficient adhesive property and corrosion resistance. Further, the magnetic recording medium described in Japanese Patent Examined Publication No. 5-33456 has the disadvantage of rusting because of lack of an undercoat layer. The magnetic recording medium described in Japanese Patent Unexamined Publication No. 57-135443 in which the organic substance is plasma polymerized on the magnetic layer, and the magnetic recording medium described in Japanese Patent Unexamined Publication No. 57-164432 in which the higher fatty acid or ester is plasma polymerized on the magnetic layer are also not sufficient in corrosion resistance, lubricity and abrasion resistance. Furthermore, the magnetic recording medium described in Japanese Patent Examined Publication No. 3-53691 (Japanese Patent No. 1687307), in which the magnetic layer is coated with the plasma-polymerized film having siloxane bonds, has no undercoat layer, resulting in formation of rust, and is also poor in abrasion resistance.

Accordingly, a magnetic recording medium having a combination of corrosion resistance, abrasion resistance, friction resistance, durability and lubricity is desirable.

SUMMARY OF THE INVENTION

In order to solve the above-mentioned problem, the present inventors have conducted intensive investigations, and as a result have discovered that the problems can be solved (1) when a magnetic recording medium structurally comprises an SiOx film, a magnetic layer, a protective layer of a diamond like carbon (DLC) film, and further a lubricating layer, all formed on a substrate, said DLC film forming the protective layer being a plasma-polymerized hydrogen-containing carbon film having a specified refractive index and contact angle and formed by applying a negative bias to a base to adjust the frequency (audio frequency, or AF) on the electrode side to a specified value, said lubricating layer being formed of a specified fluorine compound, and (2) when a magnetic recording medium structurally comprises an SiOx film, a magnetic layer, an SiOx film, a protective layer (DLC film) and further a lubricating layer, all formed on a substrate, said DLC film forming the protective layer being a plasma-polymerized hydrogen-containing carbon film having a specified refractive index and contact angle and formed by applying a negative bias to a base to adjust the frequency (AF) on the electrode side to a specified value, said lubricating layer being formed of a specified fluorine compound, thus completing the present invention.

The present invention provides: (1) a magnetic recording medium comprising an undercoat layer, a ferromagnetic metal layer, a protective layer and a lubricating layer, all formed on a non-magnetic substrate in this order, wherein said protective layer is a plasma-polymerized hydrogen-containing carbon film (DLC film) having a refractive index of 1.90 or more, a film thickness of 30 to 150 Å and a contact angle of less than 80 degrees, said undercoat layer is a film formed of silicon oxide represented by SiOx (x=1.8–1.95), and said lubricating layer is formed of a compound selected from the group consisting of polar perfluoropolyethers, non-polar perfluoropolyethers, perfluorocarboxylic acids, phosphazens, perfluoroalkylates and perfluoroacrylate compounds; (2) a magnetic recording medium comprising an undercoat layer, a ferromagnetic metal layer, an intercepting layer, a protective layer and a lubricating layer formed on a non-magnetic substrate in this order, wherein said protective layer is a plasma-polymerized hydrogen-containing carbon film (DLC film) having a refractive index of 1.90 or more and a contact angle of less than 80 degrees, said undercoat layer and said intercepting layer are films formed of silicon oxide represented by SiOx (x=1.8–1.95), the total film thickness of said protective layer and said intercepting layer is 30 to 150 Å and said lubricating layer is formed of a compound selected from the group consisting of polar perfluoropolyethers, non-polar perfluoropolyethers, perfluorocarboxylic acids, phosphazens, perfluoroalkylates and perfluoroacrylate compounds; (3) the magnetic recording medium described in (1) or (2) above, wherein said ferromagnetic metal layer is formed by vapor deposition; (4) a method for producing the magnetic recording medium described in (1) above which comprises forming an undercoat layer of silicon oxide represented by SiOx (x=1.8–1.95) on a non-magnetic substrate, forming a ferromagnetic metal layer thereon in a vapor phase, then plasma polymerizing a hydrocarbon gas and hydrogen at a frequency of 50 kHz to 450 kHz while applying a negative bias to a base side to form a protective layer of a hydrogen-containing carbon film having a refractive index of 1.90 or more, a contact angle of less than 80 degrees and a film thickness of 30 to 150 Å and finally forming a lubricating layer of a compound selected from the group consisting of polar perfluoropolyethers, non-polar perfluoropolyethers, perfluorocarboxylic acids, phosphazens, perfluoroalkylates and perfluoroacrylate compounds; (5) a method for producing the magnetic recording medium described in (2) above which comprises forming an undercoat layer of silicon oxide represented by SiOx (x=1.8–1.95) on a non-magnetic substrate, forming a ferromagnetic metal layer thereon in a vapor phase, forming an intercepting layer of a film formed of silicon oxide represented by SiOx (x=1.8–1.95) by plasma polymerization, then plasma polymerizing a hydrocarbon gas and hydrogen at a frequency of 50 kHz to 450 kHz while applying a negative bias to a base side to form a protective layer of a hydrogen-containing carbon film having a refractive index of 1.90 or more and a contact angle of less than 80 degrees, adjusting the total film thickness of the protective layer and the intercepting layer to 30 to 150 Å, and finally forming a lubricating layer of a compound selected from the group consisting of polar perfluoro-polyethers, non-polar perfluoropolyethers, perfluoro-carboxylic acids, phosphazens, perfluoroalkylates and perfluoroacrylate compounds; (6) the method described in (4) or (5) above, wherein the negative bias is a pulse bias, the pulse duty factor (ON/OFF ratio) is 0.3 to 3, and the frequency is 10 Hz to 500 Hz; and (7) the method described in (4) or (5) above, wherein the formation of the ferromagnetic metal layer in the vapor phase is by vapor deposition.

DESCRIPTION OF THE PREFERRED EMBODIMENTS

Figure 1:
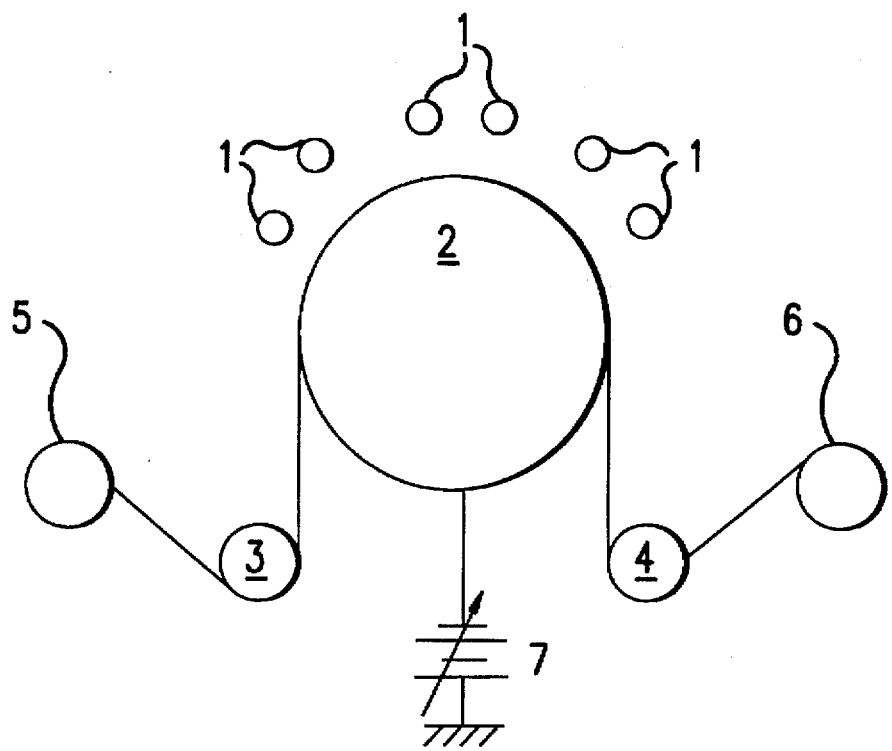
FIG. 1 is a schematic side view showing an apparatus for producing a DLC film used in the present invention. In the figure, the reference numeral 1 designates electrodes, the reference numeral 2 designates a rotating drum, the reference numerals 3 and 4 designate guide rolls, respectively, the reference numeral 5 designates a tape take-up roll, the reference numeral 6 designates a tape unwinding roll, and the reference numeral 7 designates a power supply for a DC bias.

In the present invention, the plasma-polymerized hydrogen-containing carbon film having a refractive index of 1.90 or more and a contact angle of less than 80 degrees is used as the protective layer, said film being formed by plasma polymerization by applying an audio frequency (AF) of 50 kHz to 450 kHz to the electrode side and a negative bias to the base side.

The plasma polymerization can be achieved by any known methods, for example the method described in Japanese Patent Examined Publication No. 3-53691. A vacuum chamber in which electrodes are arranged is evacuated to $10^{-6}$ Torr, and specific amounts of a raw material gas and hydrogen gas are introduced thereinto by use of a mass flow controller. After maintenance at a specified pressure, an electrical discharge is generated with an AF power supply, and the speed of a running system of a tape is controlled to give a required film thickness. In preparing the DLC film, a DC bias is applied to an electrode on the base side. Then, the vacuum is broken, and the resulting sample on which a polymerized film is formed is taken out.

As the raw materials for the plasma-polymerized hydrogen-containing carbon film forming the protective layer, various gases containing carbon and hydrogen can be used. Usually, one or more of methane, ethane, propane, butane, pentane, ethylene, propylene, butene, butadiene, acetylene, methylacetylene, and other saturated and unsaturated hydrocarbons which are gaseous at ordinary temperatures are used as carbon and hydrogen sources because of their good operability.

When the hydrocarbon gas is plasma polymerized, an audio frequency of 50 kHz to 450 kHz is applied. An audio frequency of less than 50 kHz approaches direct current (DC) in properties. Hence, discharges become unstable as the films are overlapped on the periphery according to long-term operation, which causes abnormal film quality. In addition, great damage due to ions causes damaged properties of the tape. Further, an audio frequency exceeding 450 kHz causes sluggish movement of ions, resulting in soft film quality. The resulting film is therefore poor in durability.

As to the negative bias, a negative potential is applied by DC. A pulse bias is preferably used. As the bias, there also is radio frequency (RF) bias. However, although the RF bias produces a negative potential, the negative potential is partially reversed to a positive potential. Accordingly, a completely negative potential is not necessarily obtained. Experiments show that this case was little different in properties from the case when no bias was applied.

Even when the DC bias is merely applied, the effect is manifested. However, when the DC bias is further pulsed, the sufficient bias effect is obtained even through an insulator for further improvement.

The pulse duty factor (ON/OFF ratio) is preferably 0.3 to 3. A pulse duty factor of less than 0.3 causes unstable discharges, and a pulse duty factor exceeding 3 results in no difference from the case when the DC is applied as a continuous wave (CW). The pulse duty factor is further desirably about 0.8 to 1.5.

Further, the frequency is preferably 10 Hz to 500 Hz. If the frequency is less than 10 Hz, the bias applying effect is not obtained. If the frequency exceeds 500 Hz, the film is not hardened because of its high-frequency behavior.

The refractive index of the plasma-polymerized hydrogen-containing carbon film in the present invention is 1.9 or more. A refractive index of less than 1.9 results in a significant decrease in durability and also deterioration of keeping characteristics. This is because the film hardness is lowered and a decrease in film density allows water to easily pass through the film. The reason for this is that the increased content of hydrogen in the film makes it impossible to form a cross-linked structure.

The plasma-polymerized hydrogen-containing carbon film of the magnetic recording medium of (1) mentioned above of the present invention has a film thickness of 30 to 150 Å. If the film thickness is less than 30 Å, the effect is not manifested. If the film thickness exceeds 150 Å, the electromagnetic characteristics of the deposited tape itself is affected because of the great spacing loss. Further, the contact angle thereof is less than 80 degrees. If the contact angle shows a value of 80 degrees or more, the still characteristics (durability) is not improved because of insufficient production of C=C on a surface of the film. With respect to such a film having a refractive index of 1.90 or more and a contact angle of less than 80 degrees, the methyl-methylene absorption appearing at 2,900 cm$^{-1}$ in Fourier transform infrared (FTIR) spectroscopy is little observed.

The total film thickness of the plasma-polymerized hydrogen-containing carbon film and the intercepting layer of the magnetic recording medium of (2) mentioned above of the present invention is 30 to 150 Å. If the film thickness is less than 30 Å, the effect is not manifested. If the film thickness exceeds 150 Å, the electromagnetic characteristics of the deposited tape itself are affected because of the great spacing loss. Further, the contact angle thereof is less than 80 degrees. If the contact angle shows a value of 80 degrees or more, the still characteristics are not improved because of insufficient production of C=C on a surface of the film. With respect to such a film having a refractive index of 1.90 or more and a contact angle of less than 80 degrees, the methyl-methylene absorption appearing at 2,900 cm$^{-1}$ in FTIR is little observed.

The undercoat layer of the magnetic recording medium of (1) mentioned above is a film formed of silicon oxide represented by SiOx (X=1.8–1.95). In silicon oxide wherein x is less than 1.8, carbon is left in the film, so that the density is not increased. Hence, the water-intercepting property is not manifested. Silicon oxide wherein x exceeds 1.95 is also insufficient in water-intercepting property to function properly as a water-intercepting layer. By the use of electron spectroscopy for chemical analysis (ESCA), it has been determined that the film formed of silicon oxide wherein x is less than 1.8 contains 15 atomic % of unreacted carbon atoms based on all atoms, whereas the film formed of silicon oxide wherein x is 1.8 or more contains less than 1 atomic % of unreacted carbon atoms because the reaction proceeds sufficiently. It becomes clear that the carbon content has a significant effect on water-intercepting property.

The undercoat layer and the intercepting layer of the magnetic recording medium of (2) mentioned above are films formed of silicon oxide represented by SiOx (x=1.8–1.95). In silicon oxide wherein x is less than 1.8, carbon is left in the film, so that the density is not increased. Hence, the water-intercepting property is not manifested. Silicon oxide wherein x exceeds 1.95 is also insufficient in water-intercepting property to function properly as a water-intercepting layer. By the use of electron spectroscopy for chemical analysis (ESCA), it has been determined that the film formed of silicon oxide wherein x is less than 1.8 contains 15 atomic % of unreacted carbon atoms based on all atoms, whereas the film formed of silicon oxide wherein x is 1.8 or more contains less than 1 atomic % of unreacted carbon atoms because the reaction proceeds sufficiently. It becomes clear that the carbon content has a significant effect on water-intercepting property.

The film formed of silicon oxide represented by SiOx (x=1.8–1.95) is prepared by evacuating a vacuum chamber to $10^{-6}$ Torr, then introducing specific amounts of a raw material gas and oxygen gas thereinto by use of a mass flow controller, and generating plasma with an AF power supply. In the case of the DLC film, a DC bias is applied. For the SiOx film, however, such bias is not particularly necessary though it may be applied, with the proviso that the introducing flow ratio of the raw material silane series gas to the oxygen gas (Si/O$_2$) is required to be 1/3. If the oxygen flow rate is less than this ratio, the film formed of silicon oxide wherein x is 1.8 or more can not be obtained.

The silane series gases used as the raw materials include silane, trimethylsilane, tetramethylsilane, trimethoxysilane, tetramethoxysilane and tetraethoxysilane. From the viewpoint of handling, the materials which are liquid under the standard conditions of 0° C. and 1 atm. are easily handled. As to the boiling point, the materials having a boiling point of about 100° C. are easily handled. The liquid raw materials may be supplied through a mass flow controller by use of a commercial liquid feeder.

The lubricating layer is formed by applying a solution of a compound selected from the group consisting of polar perfluoropolyethers, non-polar perfluoropolyethers, perfluorocarboxylic acids, phosphazens, perfluoroalkylates and perfluoroacrylate compounds in a solvent. Usually, there is no particular restriction on coating methods, as long as they are methods used for coating of the magnetic recording media, such as gravure coating, reverse coating and die nozzle coating. The concentration of the lubricant based on the solvent is adjusted to within 1 to 0.1% by weight.

Examples of the polar perfluoropolyethers include Crylocks (E. I. Du Pont), Z-DOL, AM2001 (Monte Dison) and SA1, SY3 (Daikin Kogyo Co.). Examples of the non-polar perfluoro-polyethers include S20 (Daikin Kogyo Co.), examples of the perfluorocarboxylic acids include n-C$_m$F$_l$COOH (m=7–10,l=14–21), examples of the perfluoroalkylates include FA108 (Kyoeisha Yushikagaku Kogyo Co.), and examples of the perfluoro-acrylate compounds include n-C$_m$F$_l$COOC$_p$F$_q$ (p=7–10,q=14–21, m and l are as defined above).

As the solvents, flon solvents such as L-90, and tributylamine solvents such as EFL-150 (Daikin Kogyo Co.) are used.

Compounds other than these lubricants, for example, saturated carboxylic acids such as stearic acid and myristic acid and silicone oil, do not give the effect. Fluorine lubricants having low surface energy are preferred for the magnetic metal layers.

As the non-magnetic substrates, various usual films are used, as long as they resist heat on vapor deposition of the ferromagnetic metal thin films. Examples of such films include films of polyesters, polyimides, aramides, polysulfones, polyether ether ketone (PEEK). Films of polyethylene terephthalate (PET) and polyethylene naphthalate (PEN) are used.

Metals such as Fe, Co and Ni and various alloys thereof are used in the ferromagnetic metal layers. Co or alloys mainly composed of Co are preferred. The alloys mainly composed of Co include Co—Ni, Co—Fe, Co—Cr, Co—Ni—Cr, Co—Pt—Cr, Co—Cu, Co—Sm and Co—P. The Co—Ni alloys are preferably used, and alloys containing about 80% or more of Co and less than 20% of Ni in molar ratio are particularly preferred. These ferromagnetic metal thin layers are formed by metal thin layer forming methods such as vacuum deposition, ion plating and sputtering. Deposition is preferably used, and oblique deposition is particularly preferred. Oxidative gases such as oxygen may be introduced during formation of the films. The thickness of the magnetic layer is 500 to 3000 Å, and preferably 1500 to 2000 Å.

In the magnetic recording medium having the ferromagnetic metal layer serving as the magnetic layer, (i) the undercoat layer on the ferromagnetic metal layer is the film formed of silicon oxide represented by SiOx (x=1.8–1.95), and the protective layer is the plasma-polymerized hydrogen-containing carbon film having a refractive index of 1.90 or more, a film thickness of 30 to 150 Å and a contact angle of less than 80 degrees, which is prepared by plasma polymerization while applying an audio frequency of 50 kHz to 450 kHz to the electrode side and a negative bias to the base side; or (ii) the undercoat layer and the intercepting layer on the ferromagnetic metal layer are the films formed of silicon oxide represented by SiOx (x=1.8–1.95), the protective layer is the plasma-polymerized hydrogen-containing carbon film having a refractive index of 1.90 or more and a contact angle of less than 80 degrees, which is prepared by plasma polymerization while applying an audio frequency of 50 kHz to 450 kHz to the electrode side and a negative bias to the base side, and the total thickness of the protective layer and the intercepting layer is 30 to 150 Å; and the lubricating layer is formed of a compound selected from the group consisting of polar perfluoropolyethers, non-polar perfluoropolyethers, perfluorocarboxylic acids, phosphazens, perfluoroalkylates and perfluoroacrylate compounds; whereby the excellent characteristics of the magnetic recording medium having the ferromagnetic metal layer serving as the magnetic layer are maintained, and the corrosion resistance, durability, abrasion resistance and lubricity thereof are improved.

As used herein, the term "contact angle" has the same meaning as commonly used and understood in the art. Definitions can be found, for example, in *McGraw-Hill Encyclopedia of Science & Technology*, 7th. edition, McGraw-Hill, Inc., New York, 1992, *Van Nostrand's Scientific Encyclopedia*, 8th. edition, Van Nostrand Reinhold, New York, 1995, and the *Dictionary of Physics*, edited by John Daintith, Barnes & Noble Books, 1981.

In the wetting or nonwetting of solids by liquids, the usual criterion is the contact angle between the solid and the liquid, as measured through the liquid. When a liquid wets the surface well, i.e., good adhesion, the contact angle is an acute angle, between 0 to 90°, and when the liquid does not wet the surface well, i.e., low adhesion, the contact angle is an obtuse angle, greater than 90°. Since an object of the present invention is to provide a magnetic recording medium having improved corrosion resistance by preventing, with a protective layer, the penetration to the magnetic layer of corrosion-causing liquid, the "wetting" of the surface of the protective layer as indicated by the contact angle being less than 80°, is a useful gauge of the adhesiveness of the protective layer as formed for the overlying lubricating layer which is applied thereto, and the adhesiveness of the protective layer to the underlying magnetic layer, or to the intermediate layer in the alternate embodiment. Thus, with a contact angle less than 80°, the protective layer as formed adheres well to the underlying magnetic film layer or intermediate layer, and provides good adhesiveness for the overlying lubricating layer.

The value of the contact angle depends on the various conditions for forming the protective layer on the magnetic recording tape by plasma polymerization of hydrocarbon gas and hydrogen gas. These conditions include plasma frequency, the use of pulse bias or continuous wave (CW), pulse duty factor and the voltage of the minus bias. In order to obtain a smaller value of contact angle (less than 80°), the following conditions are selected: (1) lower plasma frequency; (2) employment of a pulse bias rather than CW; (3) pulse duty factor between 0.3 and 3; and (4) a larger minus bias value number.

The apparatus used for measuring the contact angle is a contact angle meter, available commercially from Kyowa Kaimen Kagaku Co., Japan. In use, a sample of magnetic recording tape is place on a vertically-adjustable sample stand, with the protective layer of the tape facing upwardly. Ion-exchanged water is dropped from an injector of the apparatus to make a droplet approximately 2 mm in diameter. The water droplet is formed on the tape sample by raising and lowering the sample stand as necessary.

Figure 2:
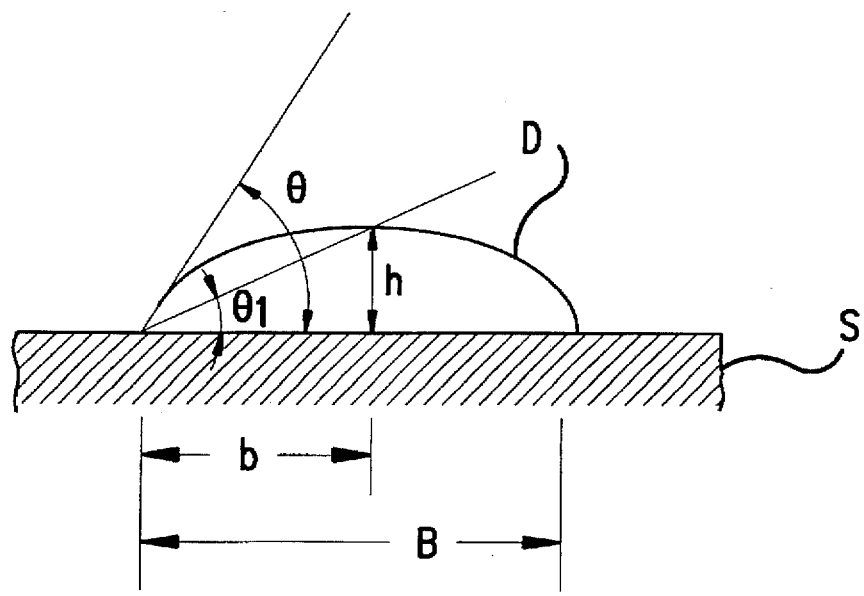
FIG. 2 is a schematic, to an enlarged scale, of a water droplet on a surface, showing how the contact angle (θ) is determined.

FIG. 2 shows how the contact angle is determined. A water droplet D has been formed on a solid surface S, such as the surface of a protective layer of DLC film. The contact angle theta ($\theta$) is measured with respect to a tangent line at the interface between the water droplet, the surface of the solid, and the surrounding atmosphere, and is determined as follows:

$\theta = 2(\theta_1)$ $\theta = -2 \tan^1 (h/b)$ where b=1/2 the base B of the water droplet h=height of the water droplet The pulse duty factor is the ratio of the time the pulse electric power is applied (ON) to the time the power is not applied (OFF). Generally, when pulse electric power is used, power is applied at a constant interval.

A discharge gives various species. Since a discharge by pulse is intermittent, plasma growth is limited. As a result, plasma is a group of species which have small distribution, is formed under pulse conditions. A film which is made from such plasma is homogeneous. Control of the pulse duty factor between 0.3 and 3 makes the contact angle less than 80°.

The film thickness and refractive index are measured by ellipsometry, a common technique for determining the properties of a material from the characteristics of polarized light reflected from its surface. When the electromagnetic waves comprising the light are reflected from the surface of the material, the amplitude of the reflected wave depends upon the properties of the material, the angle of incidence and the polarization of the wave. Further information on ellipsometry, and the procedures and apparatuses involved, can be found in most technical reference publications, such as *McGraw-Hill Encyclopedia of Science & Technology* and *Van Nostrand's Scientific Encyclopedia*, both cited above.

The composition of the SiOx film can be determined by electron spectroscopy for chemical analysis, or ESCA, also a known analytic technique. Electron spectroscopy is the study of the energy spectra of photoelectron or Auger electrons emitted from a substance upon bombardment by electromagnetic radiation, electrons, or ions, and is commonly used to investigate atomic, molecular or solid-state structure, and in chemical analysis. ESCA, also sometimes known as x-ray photoelectron spectroscopy, is a form of electron spectroscopy in which a sample is irradiated with a beam of monochromatic x-rays and the energies of the resulting photoelectrons are measured. Additional details on ESCA, and its use to determining chemical composition, can be found in most technical reference publications, such as the *McGraw-Hill Encyclopedia of Science & Technology*, cited above, Volume 6.

The present invention is described further with reference to the following examples. The characteristics of the magnetic recording tapes were measured as follows:

(1) Still Durability

A signal at 7 MHz was recorded under conditions of 40° C. and 20% relative humidity (RH), and the time required until its output reached −5 dB was measured.

(2) Corrosion Resistance

Each sample was kept under conditions of 60° C. and 90% RH for 1 week, and the reduction rate in saturation magnetic flux density was measured.

(3) Initial Friction

The friction coefficient at the first pass was measured with a commercially-available 180-degree pin friction tester.

(4) Durable Friction

The friction coefficient at the 500th pass was measured with a 180-degree pin friction tester.

(5) Surface Observation

The surface condition of each sample after 200 passes was observed under an optical microscope to examine the extent of surface scratching. No scratch is indicated by ◯, 1 to 5 scratches by △, and 6 scratches or more by X.

(6) Electromagnetic Characteristics

When the output at 7 MHz in Comparative Example 1 given below was taken as 0 dB, a difference in output between the sample in Comparative Example 1 and each sample of less than 2 dB is indicated by ◯, and a difference of 2 dB or more by X.

A. Magnetic Recording Media of (1)

EXAMPLES 1 TO 20 AND COMPARATIVE EXAMPLES 1 TO 29

The inside of a chamber was evacuated to $10^{-6}$ Torr, and then tetramethoxysilane as a raw material and oxygen were introduced thereinto at a ratio of 1:3, followed by adjustment of the pressure to $10^{-2}$ Torr. Then, an audio frequency of 100 kHz was applied to an electrode to generate plasma discharges and to plasma polymerize SiOx having each of the various compositions shown in Tables 1-1 to 1-5, thereby forming an undercoat layer on a polyethylene terephthalate film substrate having a thickness of 7 µm. The x value in the SiOx film was changed by varying the ratio of oxygen introduced together with the silane series organic compound.

Subsequently, an alloy containing 80% by weight of Co and 20% by weight of Ni was deposited under an oxygen atmosphere to form a ferromagnetic metal layer (with a film thickness of 1,500 Å). A protective layer was formed thereon by plasma polymerization using methane as a hydrocarbon source by use of a DLC film producing apparatus such as shown in FIG. 1. Namely, the inside of a chamber was evacuated to $10^{-6}$ Torr, and then methane as a raw material and hydrogen were introduced thereinto at a ratio of 1:1, followed by adjustment of the pressure to $10^{-2}$ Torr. Then, electromagnetic waves were applied to electrodes at high frequency to generate plasma discharges. At the same time, a DC bias was applied with the connections as shown in FIG. 1.

The protective layer was further coated by gravure coating with a solution prepared by dissolving each of the various lubricants shown in Tables 1-6 to 1-10 in a solvent, EFL-150 (Daikin Kogyo Co.), in a concentration of 0.3% by weight. The film thickness was about 40 Å. As the DC bias on the base side, one having a pulse generation mechanism was used.

S20 (Daikin Kogyo Co.) was used as a non-polar perfluoro-polyether (PFPE), KF-851 (Shinetsu Kagaku kogyo Co.) as silicone oil, SA1 (Daikin Kogyo Co.) as a polar PFPE, n-$C_{10}F_{20}$COOH as a perfluorocarboxylic acid (PFA), phosphazene (Idemitsu Sekiyu Kagaku Co.) as a phosphazene, FA108 (Kyoeisha Yushikagaku Kogyo Co.) as a perfluoroacrylate, and n-$C_{10}F_{20}$COO$C_{10}F_{20}$ as a perfluoroalkylate to form a lubricating layer.

The composition and the film thickness of the SiOx undercoat layers, the plasma frequency and the bias on film formation of the plasma-polymerized hydrogen-containing carbon film protective layers, and the film thickness, the refractive index and the contact angle of the resulting protective layers are shown in Tables 1-1 to 1-5. When the pulse bias is used, the pulse is 50 Hz. Further, for the resulting magnetic recording tapes, the materials of the lubricating layers, the still time, the corrosion resistance, the initial friction, the durable friction, the results of surface observation and the electromagnetic characteristics are shown in Tables 1-6 to 1-10.

The film thickness and the refractive index were measured by ellipsometry. The composition of SiOx was measured by ESCA. The contact angle was measured by a droplet dropping system using a contact angle meter (Kyowa Kaimen Kagaku Co.). For comparison, protective layers were formed using RF (radio frequency: 13.56 MHz) and 1 MHz.

TABLE 1

| | Protective Film (DLC Film) | | | | | | Undercoat layer (SiOx) | |
|---|---|---|---|---|---|---|---|---|
| | Plasma Frequency (kHz) | Bias | Bias V | Film Thickness (Å) | Refractive Index | Contact Angle | Film Thickness (Å) | Value of x |
| Example 1 | 400 | CW | −200 | 100 | 1.95 | 77 | 200 | 1.9 |
| Example 2 | 200 | CW | −200 | 100 | 1.97 | 77 | 200 | 1.9 |
| Example 3 | 100 | CW | −200 | 100 | 1.98 | 76 | 200 | 1.9 |
| Example 4 | 50 | CW | −200 | 100 | 2.0 | 75 | 200 | 1.9 |
| Example 5 | 400 | pulse | −200 | 100 | 1.97 | 75 | 200 | 1.9 |
| Example 6 | 200 | pulse | −200 | 100 | 1.98 | 75 | 200 | 1.9 |
| Example 7 | 100 | Pulse | −200 | 100 | 2.0 | 74 | 200 | 1.9 |
| Example 8 | 50 | pulse | −200 | 100 | 2.1 | 73 | 200 | 1.9 |
| Example 9 | 400 | CW | −200 | 30 | 1.95 | 77 | 200 | 1.9 |
| Example 10 | 400 | CW | −200 | 50 | 1.95 | 77 | 200 | 1.9 |
| Example 11 | 400 | CW | −200 | 150 | 1.95 | 77 | 200 | 1.9 |
| Example 12 | 400 | CW | −200 | 100 | 1.95 | 77 | 300 | 1.9 |
| Example 13 | 400 | CW | −200 | 100 | 1.95 | 77 | 200 | 1.8 |
| Example 14 | 400 | CW | −200 | 100 | 1.95 | 77 | 200 | 1.95 |
| Example 15 | 400 | CW | −200 | 100 | 1.95 | 77 | 200 | 1.9 |
| Exdmple 16 | 400 | CW | −200 | 100 | 1.95 | 77 | 200 | 1.9 |

TABLE 1-continued

| | Protective Film (DLC Film) | | | | | | Undercoat layer (SiOx) | |
|---|---|---|---|---|---|---|---|---|
| Example 17 | 400 | CW | −200 | 100 | 1.95 | 77 | 200 | 1.9 |
| Example 18 | 400 | pulse | −200 | 100 | 1.97 | 75 | 200 | 1.9 |
| Example 19 | 400 | pulse | −200 | 100 | 1.97 | 75 | 200 | 1.9 |
| Example 20 | 400 | pulse | −200 | 100 | 1.97 | 75 | 200 | 1.9 |
| Comparative Example 1 | — | — | — | — | — | — | — | — |
| Comparative Example 2 | 13.56 | CW | −200 | 100 | 1.7 | 85 | 200 | 1.9 |
| Comparative Example 3 | 1 | CW | −200 | 100 | 1.8 | 82 | 200 | 1.9 |
| Comparative Example 4 | 500 | CW | −200 | 100 | 1.8 | 81 | 200 | 1.9 |
| Comparative Example 5 | 20 | CW | −200 | 100 | 1.95 | 80 | 200 | 1.9 |
| Comparative Example 6 | 400 | — | 0 | 100 | 1.85 | 83 | 200 | 1.9 |
| Comparative Example 7 | 200 | — | 0 | 100 | 1.86 | 82 | 200 | 1.9 |
| Comparative Example 8 | 100 | — | 0 | 100 | 1.87 | 81 | 200 | 1.9 |
| Comparative Example 9 | 50 | — | 0 | 100 | 1.88 | 80 | 200 | 1.9 |
| Comparative Example 10 | 400 | CW | −200 | 20 | 1.95 | 77 | 200 | 1.9 |
| Comparative Example 11 | 400 | CW | −200 | 200 | 1.95 | 77 | 200 | 1.9 |
| Comparative Example 12 | 400 | CW | −200 | 100 | 1.95 | 77 | 50 | 1.9 |
| Comparative Example 13 | 400 | CW | −200 | 100 | 1.95 | 77 | 100 | 1.9 |
| Comparative Example 14 | 400 | CW | −200 | 100 | 1.95 | 77 | 200 | 1.5 |
| Comparative Example 15 | 400 | CW | −200 | 100 | 1.95 | 77 | 200 | 1.7 |
| Comparative Example 16 | 400 | CW | −200 | 100 | 1.95 | 77 | 200 | 2.0 |
| Comparative Example 17 | 400 | pulse | −200 | 100 | 1.97 | 75 | 200 | 1.9 |
| Comparative Example 18 | 400 | pulse | −200 | 100 | 1.97 | 75 | 200 | 1.9 |
| Comparative Example 19 | — | — | — | — | — | — | — | — |
| Comparative Example 20 | 400 | CW | −200 | 100 | 1.95 | 77 | 200 | 1.9 |
| Comparative Example 21 | 200 | CW | −200 | 100 | 1.95 | 77 | 200 | 1.9 |
| Comparative Example 22 | 100 | CW | −200 | 100 | 1.95 | 77 | 200 | 1.9 |
| Comparative Example 23 | 50 | CW | −200 | 100 | 1.95 | 77 | 200 | 1.9 |
| Comparative Example 24 | 400 | pulse | −200 | 100 | 1.97 | 75 | 200 | 1.9 |
| Comparative Example 25 | 200 | pulse | −200 | 100 | 1.98 | 75 | 200 | 1.9 |
| Comparative Example 26 | 100 | pulse | −200 | 100 | 2.0 | 74 | 200 | 1.9 |
| Comparative Example 27 | 50 | pulse | −200 | 100 | 2.1 | 73 | 200 | 1.9 |
| Comparative Example 28 | 400 | CW | −200 | 100 | 1.95 | 97 | — | — |
| Comparative Example 29 | — | — | — | — | — | — | 200 | 1.9 |

| | Liquid Lubricant Name of Material | Still (min) | Corrosion Resistance (%) | Initial Friction (μ) | Durable Friction 500 passes (μ) | Surface Observation | Electromagnetic Characteristics |
|---|---|---|---|---|---|---|---|
| Example 1 | polar PFPE | 90 | 3 | 0.2 | 0.34 | o | o |
| Example 2 | polar PFPE | 90 | 3 | 0.2 | 0.33 | o | o |
| Example 3 | polar PFPE | 90 | 3 | 0.2 | 0.32 | o | o |
| Example 4 | polar PFPE | 90 | 3 | 0.2 | 0.3 | o | o |
| Example 5 | polar PFPE | >120 | 2 | 0.15 | 0.28 | o | o |
| Example 6 | polar PFPE | >120 | 2 | 0.15 | 0.27 | o | o |
| Example 7 | polar PFPE | >120 | 2 | 0.15 | 0,26 | o | o |
| Example 8 | polar PFPE | >120 | 2 | 0.15 | 0.25 | o | o |
| Example 9 | polar PFPE | 90 | 3 | 0.2 | 0.34 | o | o |

TABLE 1-continued

| | | Protective Film (DLC Film) | | | | Undercoat layer (SiOx) | |
|---|---|---|---|---|---|---|---|
| Example 10 | polar PFPE | 90 | 3 | 0.2 | 0.34 | o | o |
| Example 11 | polar PFPE | 90 | 3 | 0.2 | 0.34 | o | o |
| Example 12 | polar PFPE | 90 | 3 | 0.2 | 0.34 | o | o |
| Example 13 | polar PFPE | 90 | 3 | 0.2 | 0.34 | o | o |
| Example 14 | polar PFPE | 90 | 3 | 0.2 | 0.34 | o | o |
| Example 15 | non-polar PFPE | 90 | 3 | 0.2 | 0.34 | o | o |
| Example 16 | PFA | 90 | 3 | 0.2 | 0.34 | o | o |
| Example 17 | phosphazene | 90 | 3 | 0.2 | 0.34 | o | o |
| Example 18 | non-polar PFPE | >120 | 2 | 0.15 | 0.28 | o | o |
| Example 19 | PFA | >120 | 2 | 0.15 | 0.28 | o | o |
| Example 20 | phosphazene | >120 | 2 | 0.15 | 0.28 | o | o |
| Comparative Example 1 | polar PFPE | 0.5 | 25 | 0.3 | 0.65 | x | o |
| Comparative Example 2 | polar PFPE | 1 | 15 | 0.5 | 0.85 | x | o |
| Comparative Example 3 | polar PFPE | 5 | 10 | 0.35 | 0.8 | x | o |
| Comparative Example 4 | polar PFPE | 5 | 10 | 0.32 | 0.65 | x | o |
| Comparative Example 5 | polar PFPE | 5 | 10 | 0.3 | 0.5 | Δ | o |
| Comparative Example 6 | polar PFPE | 2 | 15 | 0.25 | 0.8 | x | o |
| Comparative Example 7 | polar PFPE | 5 | 15 | 0.25 | 0.75 | x | o |
| Comparative Example 8 | polar PFPE | 15 | 10 | 0.25 | 0.6 | o | |
| Comparative Example 9 | polar PFPE | 15 | 10 | 0.25 | 0.5 | Δ | o |
| Comparative Example 10 | polar PFPE | 5 | 10 | 0.2 | 0.65 | x | o |
| Comparative Example 11 | polar PFPE | 90 | 3 | 0.2 | 0.34 | o | x |
| Comparative Example 12 | polar PFPE | 90 | 10 | 0.2 | 0.65 | x | o |
| Comparative Example 13 | polar PFPE | 90 | 10 | 0.2 | 0.65 | x | o |
| Comparative Example 14 | polar PFPE | 10 | 15 | 0.2 | 0.65 | x | o |
| Comparative Example 15 | polar PFPE | 10 | 10 | 0.2 | 0.65 | x | o |
| Comparative Example 16 | polar PFPE | 5 | 15 | 0.2 | 0.3 | x | o |
| Comparative Example 17 | fatty acid | 2 | 2 | 0.35 | 100 passes | x | o |
| Comparative Example 18 | silicone oil | 2 | 2 | 0.4 | 100 passes | x | o |
| Comparative Example 19 | — | 0.5 | 25 | 0.5 | unmeasurable | x | o |
| Comparative Example 20 | — | 30 | 3 | 0.3 | 0.65 | x | o |
| Comparative Example 21 | — | 30 | 3 | 0.3 | 0.65 | x | o |
| Comparative Example 22 | — | 30 | 3 | 0.3 | 0.6 5 | x | o |
| Comparative Example 23 | — | 30 | 3 | 0.3 | 0.65 | x | o |
| Comparative Example 24 | — | 30 | 3 | 0.3 | 0.65 | x | o |
| Comparative Example 25 | — | 30 | 3 | 0.3 | 0.65 | x | o |
| Comparative Example 26 | — | 30 | 3 | 0.3 | 0.5 | Δ | o |
| Comparative Example 27 | — | 30 | 3 | 0.3 | 0.5 | Δ | o |
| Comparative Example 28 | polar PFPE | 30 | 15 | 0.25 | 0.34 | o | o |
| Comparative Example 29 | polar PFPE | 0.5 | 15 | 0.25 | 0.65 | x | o |

EXAMPLES 21 TO 42

SiOx (x=1.900) was plasma polymerized using a mixture of tetramethoxysilane and oxygen at a discharge frequency of 400 kHz to form an undercoat layer on a polyethylene terephthalate film substrate having a thickness of 7 μm, and an alloy containing 80% by weight of Co and 20% by weight of Ni was deposited thereon under an oxygen atmosphere to form a ferromagnetic metal layer (with a film thickness of 1,500 Å). Each of the various hydrocarbons shown in Tables 2-1 and 2-2 was plasma polymerized to form a protective layer. Further, using a polar perfluoropolyether (PFPE) as a liquid lubricant, a lubricating layer was formed.

The film thickness of the SiOx undercoat layers, the kinds of hydrocarbons, the plasma frequency and the bias on film formation, and the film thickness, the refractive index and the contact angle of the resulting protective layers are shown in Tables 2-1 and 2-2. Further, for the resulting magnetic recording tapes, the still time, the corrosion resistance, the initial friction, the durable friction, the results of surface observation and the electromagnetic characteristics are shown in Tables 2-3 and 2-4.

The film thickness, the refractive index, the composition of SiOx and the contact angle were measured in the same manner as with Examples 1 to 20.

EXAMPLE 43 TO 57 AND COMPARATIVE EXAMPLES 30 TO 36

Magnetic recording media were produced in the same manner as with the above-mentioned Examples, with the exception that CW and a pulse bias were used as the negative bias, and the pulse frequency Hz, the flow ratio of $CH_4/H$ and the pulse ratio ON/OFF were variously changed. The pulse ratio was changed by setting the ON/OFF time with a setting switch attached to a power supply.

Results are shown in the following Tables 3-1 to 3-4.

TABLE 2

| | Protective Film (DLC Film) | | | | | | | Undercoat layer (SiOx) | |
|---|---|---|---|---|---|---|---|---|---|
| | Plasma Frequency (kHz) | Bias | Bias V | Film Thickness (Å) | Raw Material Gas | Refractive Index | Contact Angle | Film Thickness (Å) | Value of x |
| Example 21 | 400 | CW | −200 | 100 | methane/H2 | 1.95 | 77 | 200 | 1.9 |
| Example 22 | 400 | pulse | −200 | 100 | methane/H2 | 1.97 | 75 | 200 | 1.9 |
| Example 23 | 400 | CW | −200 | 100 | ethane | 1.95 | 77 | 200 | 1.9 |
| Example 24 | 400 | CW | −200 | 100 | ethane/H2 | 1.95 | 77 | 200 | 1.9 |
| Example 25 | 400 | pulse | −200 | 100 | ethane | 1.97 | 75 | 200 | 1.9 |
| Example 26 | 400 | pulse | −200 | 100 | ethane/H2 | 1.97 | 75 | 200 | 1.9 |
| Example 27 | 400 | CW | −200 | 100 | propane | 1.95 | 77 | 200 | 1.9 |
| Example 28 | 400 | CW | −200 | 100 | propane/H2 | 1.95 | 77 | 200 | 1.9 |
| Example 29 | 400 | pulse | −200 | 100 | propane | 1.97 | 75 | 200 | 1.9 |
| Example 30 | 400 | pulse | −200 | 100 | propane/H2 | 1.97 | 75 | 200 | 1.9 |
| Example 31 | 400 | CW | −200 | 100 | butane | 1.95 | 77 | 200 | 1.9 |
| Example 32 | 400 | CW | −200 | 100 | butane/H2 | 1.95 | 77 | 200 | 1.9 |
| Example 33 | 400 | pulse | −200 | 100 | butane | 1.97 | 75 | 200 | 1.9 |
| Example 34 | 400 | pulse | −200 | 100 | butane/H2 | 1.97 | 75 | 200 | 1.9 |
| Example 35 | 400 | CW | −200 | 100 | ethylene | 1.97 | 76 | 200 | 1.9 |
| Example 36 | 400 | CW | −200 | 100 | ethylene/H2 | 1.97 | 76 | 200 | 1.9 |
| Example 37 | 400 | pulse | −200 | 100 | ethylene | 2.0 | 74 | 200 | 1.9 |
| Example 38 | 400 | pulse | −200 | 100 | ethylene/H2 | 2.0 | 74 | 200 | 1.9 |
| Example 39 | 400 | CW | −200 | 100 | acetylene | 1.97 | 76 | 200 | 1.9 |
| Example 40 | 400 | CW | −200 | 100 | acetylene/H2 | 1.97 | 76 | 200 | 1.9 |
| Example 41 | 400 | pulse | −200 | 100 | acetylene | 2.0 | 74 | 200 | 1.9 |
| Example 42 | 400 | pulse | −200 | 100 | acetylene/H2 | 2.0 | 74 | 200 | 1.9 |

| | Liquid Lubricant Name of Material | Still (min) | Corrosion Resistance (%) | Initial Friction (μ) | Durable Friction 500 passes (μ) | Surface Observation | Electromagnetic Characteristics |
|---|---|---|---|---|---|---|---|
| Example 21 | polar PFPE | 90 | 3 | 0.2 | 0.34 | o | o |
| Example 22 | polar PFPE | >120 | 2 | 0.15 | 0.28 | o | o |
| Example 23 | polar PFPE | 90 | 3 | 0.2 | 0.34 | o | o |
| Example 24 | polar PFPE | 90 | 3 | 0.2 | 0.34 | o | o |
| Example 25 | polar PFPE | >120 | 2 | 0.15 | 0.28 | o | o |
| Example 26 | polar PFPE | >120 | 2 | 0.15 | 0.28 | o | o |
| Example 27 | polar PFPE | 90 | 3 | 0.21 | 0.34 | o | o |
| Example 28 | polar PFPE | 90 | 3 | 0.2i | 0.34 | o | o |
| Example 29 | polar PFPE | >120 | 2 | 0.15 | 0.28 | o | o |
| Example 30 | polar PFPE | >120 | 2 | 0.15 | 0.28 | o | |
| Example 31 | polar PFPE | 90 | 3 | 0.22 | 0.35 | o | o |
| Example 32 | polar PFPE | 90 | 3 | 0.22 | 0.34 | o | o |
| Example 33 | polar PFPE | >120 | 2 | 0.15 | 0.28 | o | o |
| Example 34 | polar PFPE | >120 | 2 | 0.15 | 0.28 | o | o |
| Example 35 | polar PFPE | 100 | 2 | 0.18 | 0.3 | o | o |
| Example 36 | polar PFPE | 100 | 2 | 0.19 | 0.3 | o | o |
| Example 37 | polar PFPE | >120 | 2 | 0.15 | 0.28 | o | o |
| Example 38 | polar PFPE | >120 | 2 | 0.15 | 0.28 | o | o |
| Example 39 | polar PFPE | 100 | 3 | 0.16 | 0.3 | o | o |
| Example 40 | polar PFPE | 100 | 3 | 0.16 | 0.3 | o | o |
| Example 41 | polar PFPE | >120 | 2 | 0.14 | 0.25 | o | o |
| Example 42 | polar PFPE | >120 | 2 | 0.14 | 0.25 | o | o |

TABLE 3

| | Plasma Frequency (kHz) | Bias | Bias V | Flow Ratio ($CH_4/H_2$) | Pulse Ratio (ON/OFF) | Pulse Frequency Hz | Film Thickness (Å) | Refractive Index | Contact Angle |
|---|---|---|---|---|---|---|---|---|---|
| Example 43 | 400 | CW | −200 | 1/3 | — | — | 100 | 1.95 | 77 |
| Example 44 | 400 | CW | −200 | 1/2 | — | — | 100 | 1.95 | 77 |
| Example 45 | 400 | CW | −200 | 2/1 | — | — | 100 | 1.95 | 77 |
| Example 46 | 400 | CW | −200 | 3/1 | — | — | 100 | 1.95 | 77 |
| Example 47 | 400 | pulse | −200 | 1/1 | 1/3 | 50 | 100 | 1.95 | 79 |
| Example 48 | 400 | pulse | −200 | 1/1 | 1/2 | 50 | 100 | 1.95 | 77 |
| Example 49 | 400 | pulse | −200 | 1/1 | 2/1 | 50 | 100 | 1.95 | 77 |
| Example 50 | 400 | pulse | −200 | 1/1 | 3/1 | 50 | 100 | 1.95 | 77 |
| Example 51 | 400 | pulse | −200 | 1/1 | 1/1 | 10 | 100 | 1.95 | 79 |
| Example 52 | 400 | pulse | −200 | 1/1 | 1/1 | 20 | 100 | 1.95 | 77 |
| Example 53 | 400 | pulse | −200 | 1/1 | 1/1 | 100 | 100 | 1.95 | 77 |
| Example 54 | 400 | pulse | −200 | 1/1 | 1/1 | 200 | 100 | 1.95 | 77 |
| Example 55 | 400 | pulse | −200 | 1/1 | 1/1 | 300 | 100 | 1.95 | 77 |
| Example 56 | 400 | pulse | −200 | 1/1 | 1/1 | 400 | 100 | 1.95 | 77 |
| Example 57 | 400 | pulse | −200 | 1/1 | 1/1 | 500 | 100 | 1.95 | 77 |
| Comparative Example 30 | 400 | CW | −200 | 1/4 | — | — | 100 | 1.88 | 80 |
| Comparative Example 31 | 400 | CW | −200 | 4/1 | — | — | 100 | 1.9 | 80 |
| Compardtive Example 32 | 400 | pulse | −200 | 1/1 | 4/1 | 50 | 100 | 1.88 | 77 |
| Comparative Example 33 | 400 | pulse | −200 | 1/1 | 1/4 | 50 | 100 | 1.85 | 82 |
| Comparative Example 34 | 400 | pulse | −200 | 1/1 | 1/1 | 5 | 100 | 1.88 | 80 |
| Comparative Example 35 | 400 | pulse | −200 | 1/1 | 1/1 | 600 | 100 | 1.8 | 81 |
| Comparative Example 36 | 400 | pulse | −200 | 1/1 | 1/1 | 1000 | 100 | 1.8 | 81 |

| | Still (min) | Corrosion Resistance (%) | Initial Friction (μ) | Durable Friction 500 passes (μ) | Surface Observation | Electromagnetic Characteristics |
|---|---|---|---|---|---|---|
| Example 43 | 90 | 3 | 0.25 | 0.34 | o | |
| Example 44 | 90 | 3 | 0.25 | 0.34 | o | o |
| Example 45 | 90 | 3 | 0.25 | 0.34 | o | o |
| Example 46 | 90 | 3 | 0.25 | 0.34 | o | o |
| Example 47 | 120 | 2 | 0.2 | 0.35 | o | o |
| Example 48 | 120 | 2 | 0.2 | 0.34 | o | o |
| Example 49 | 120 | 2 | 0.2 | 0.35 | o | o |
| Example 50 | 120 | 2 | 0.2 | 0.35 | o | o |
| Example 51 | 120 | 2 | 0.2 | 0.35 | o | o |
| Example 52 | 120 | 2 | 0.2 | 0.35 | o | o |
| Example 53 | 120 | 2 | 0.2 | 0.35 | o | o |
| Example 54 | 120 | 2 | 0.2 | 0.35 | o | o |
| Example 55 | 120 | 2 | 0.2 | 0.35 | o | o |
| Example 56 | 120 | 2 | 0.2 | 0.35 | o | o |
| Example 57 | 120 | 2 | 0.2 | 0.35 | o | o |
| Comparative Example 30 | 10 | 5 | 0.3 | 0.7 | x | x |
| Comparative Example 31 | 10 | 10 | 0.3 | 0.5 | Δ | x |
| Comparative Example 32 | 30 | 10 | 0.25 | 0.55 | x | x |
| Comparative Example 33 | 5 | 10 | 0.3 | 0.7 | x | x |
| Comparative Example 34 | 10 | 5 | 0.3 | 0.9 | x | x |
| Comparative Example 35 | 5 | 10 | 0.32 | 0.6 | x | x |
| Comparative Example 36 | 5 | 10 | 0.32 | 0.6 | x | x |

B. Magnetic Recording Media of (2)

EXAMPLES 58 TO 85 AND COMPARATIVE EXAMPLES 37 TO 65

The inside of a chamber was evacuated to $10^{-6}$ Torr, and then tetramethoxysilane as a raw material and oxygen were introduced thereinto at a ratio of 1:3, followed by adjustment of the pressure to $10^{-2}$ Torr. Then, an audio frequency of 100 kHz was applied to an electrode to generate plasma discharges and to plasma polymerize SiOx having each of the various compositions shown in Tables 4-1 to 4-6, thereby forming an undercoat layer on a polyethylene terephthalate film substrate having a thickness of 7 μm. Subsequently, an alloy containing 80% by weight of Co and 20% by weight of Ni was deposited under an oxygen atmosphere to form a ferromagnetic metal layer (with a film thickness of 1,500 Å), and SiOx having each of the various compositions shown in Tables 4-1 to 4-6 was plasma polymerized thereon in a manner similar to that described above to form a intercepting layer. The x value in the SiOx film was changed by varying the ratio of oxygen introduced together with the silane series organic compound.

Then, a protective layer was formed thereon by plasma polymerization using methane as a hydrocarbon source by use of a DLC film producing apparatus such as shown in FIG. 1. Namely, the inside of a chamber was evacuated to $10^{-6}$ Torr, and then methane as a raw material and hydrogen were introduced thereinto at a ratio of 1:1, followed by adjustment of the pressure to $10^{-2}$ Torr. Thereafter, electromagnetic waves were applied to electrodes at high frequency to generate plasma discharges. At the same time, a DC bias was applied connecting as shown in FIG. 1. As the DC bias on the base side, one having a pulse generation mechanism was used.

The protective layer was further coated by gravure coating with a solution prepared by dissolving each of the various lubricants shown in Tables 7 to 12 in a solvent, EFL-150 (Daikin Kogyo Co.), in a concentration of 0.3% by weight, thereby forming a lubricating layer. The film thickness was about 40 Å.

S20 (Daikin Kogyo Co.) was used as a non-polar perfluoro-polyether (PFPE), KF-851 (Shinetsu Kagaku Kogyo Co.) as silicone oil, SA1 (Daikin Kogyo Co.) as a polar PFPE, n-$C_{10}F_{20}$COOH as a perfluorocarboxylic acid (PFA), phosphazene (Idemitsu Sekiyu Kagaku Co.) as a phosphazene, FA108 as a perfluoroacrylate, and n-$C_{10}F_{20}$COO$C_{10}F_{20}$ as a perfluoroalkylate. The composition and the film thickness of the SiOx undercoat layers, the plasma frequency and the bias on film formation of the hydrogen-containing carbon film protective layers, and the film thickness, the refractive index and the contact angle of the resulting protective layers are shown in Tables 4-1 to 4-6. When the pulse bias is used, the pulse is 50 Hz. Further, for the resulting magnetic recording tapes, the materials of the lubricating layers, the still time, the corrosion resistance, the initial friction, the durable friction, the results of surface observation and the electromagnetic characteristics are shown in Tables 4-7 to 4-12.

The film thickness and the refractive index were measured by ellipsometry. The composition of SiOx was measured by ESCA. The contact angle was measured by a droplet dropping system using a contact angle meter (Kyowa Kaimen Kagaku Co.). For comparison, protective layers were formed using RF and 1 MHz.

TABLE 4

| | Protective Film (DLC Film) | | | | | Intercepting Film (SiOx Film) | | Undercoat layer (SiOx Film) | |
|---|---|---|---|---|---|---|---|---|---|
| | Plasma Frequency (kHz) | Bias | Bias V | Film Thickness (Å) | Refractive Index | Contact Angle | Film Thickness (Å) | Value of x | Film Thickness (Å) | Value of x |
| Example 58 | 400 | CW | −200 | 50 | 1.95 | 77 | 50 | 1.90 | 200 | 1.90 |
| Example 59 | 200 | CW | −200 | 50 | 1.97 | 77 | 50 | 1.90 | 200 | 1.90 |
| Example 60 | 100 | CW | −200 | 50 | 1.98 | 76 | 50 | 1.90 | 200 | 1.90 |
| Example 61 | 50 | CW | −200 | 50 | 2.0 | 75 | 50 | 1.90 | 200 | 1.90 |
| Example 62 | 400 | pulse | −200 | 50 | 1.97 | 75 | 50 | 1.90 | 200 | 1.90 |
| Example 63 | 200 | pulse | −200 | 50 | 1.98 | 75 | 50 | 1.90 | 200 | 1.90 |
| Example 64 | 100 | pulse | −200 | 50 | 2.0 | 74 | 50 | 1.90 | 200 | 1.90 |
| Example 65 | 50 | pulse | −200 | 50 | 2.1 | 73 | 50 | 1.90 | 200 | 1.90 |
| Example 66 | 400 | CW | −200 | 30 | 1.95 | 77 | 50 | 1.90 | 200 | 1.90 |
| Example 67 | 400 | CW | −200 | 80 | 1.95 | 77 | 50 | 1.90 | 200 | 1.90 |
| Example 68 | 400 | CW | −200 | 50 | 1.95 | 77 | 30 | 1.90 | 200 | 1.90 |
| Example 69 | 400 | CW | −200 | 50 | 1.95 | 77 | 80 | 1.90 | 200 | 1.90 |
| Example 70 | 400 | CW | −200 | 50 | 1.95 | 77 | 50 | 1.80 | 200 | 1.90 |
| Example 71 | 400 | CW | −200 | 50 | 1.95 | 77 | 50 | 1.95 | 200 | 1.90 |
| Example 72 | 400 | CW | −200 | 50 | 1.95 | 77 | 50 | 1.90 | 150 | 1.90 |
| Example 73 | 400 | CW | −200 | 50 | 1.95 | 77 | 50 | 1.90 | 150 | 1.90 |
| Example 74 | 400 | CW | −200 | 50 | 1.95 | 77 | 50 | 1.90 | 200 | 1.90 |
| Example 75 | 400 | CW | −200 | 50 | 1.95 | 77 | 50 | 1.90 | 200 | 1.95 |
| Example 76 | 400 | CW | −200 | 50 | 1.95 | 77 | 50 | 1.90 | 200 | 1.90 |
| Example 77 | 400 | CW | −200 | 50 | 1.95 | 77 | 50 | 1.90 | 200 | 1.90 |
| Example 78 | 400 | CW | −200 | 50 | 1.95 | 77 | 50 | 1.90 | 200 | 1.90 |
| Example 79 | 400 | pulse | −200 | 50 | 1.97 | 75 | 50 | 1.90 | 200 | 1.90 |
| Example 80 | 400 | pulse | −200 | 50 | 1.97 | 75 | 50 | 1.90 | 200 | 1.90 |
| Example 81 | 400 | pulse | −200 | 50 | 1.97 | 75 | 50 | 1.90 | 200 | 1.90 |
| Example 82 | 400 | CW | −200 | 50 | 1.95 | 77 | 50 | 1.90 | 200 | 1.90 |
| Example 83 | 400 | CW | −200 | 50 | 1.95 | 77 | 50 | 1.90 | 200 | 1.90 |
| Example 84 | 400 | CW | −200 | 50 | 1.95 | 77 | 100 | 1.90 | 200 | 1.90 |
| Example 85 | 400 | CW | −200 | 100 | 1.95 | 77 | 50 | 1.90 | 200 | 1.90 |
| Comparative Example 37 | 13.51 | CW | −200 | 50 | 1.70 | 85 | 50 | 1.90 | 200 | 1.90 |
| Comparative Example 38 | 1 | CW | −200 | 50 | 1.80 | 82 | 50 | 1.90 | 200 | 1.90 |
| Comparative Example 39 | 500 | CW | −200 | 50 | 1.80 | 81 | 50 | 1.90 | 200 | 1.90 |
| Comparative Example 40 | 20 | CW | −200 | 50 | 1.95 | 80 | 50 | 1.90 | 200 | 1.90 |
| Comparative Example 41 | 400 | — | 0 | 50 | 1.85 | 83 | 50 | 1.90 | 200 | 1.90 |

TABLE 4-continued

| | | | | | | | | | | |
|---|---|---|---|---|---|---|---|---|---|---|
| Comparative Example 42 | 200 | — | 0 | 50 | 1.86 | 82 | 50 | 1.90 | 200 | 1.90 |
| Comparative Example 43 | 100 | — | 0 | 50 | 1.87 | 81 | 50 | 1.90 | 200 | 1.90 |
| Comparative Example 44 | 50 | — | 0 | 50 | 1.88 | 80 | 50 | 1.90 | 200 | 1.90 |
| Comparative Example 45 | 400 | CW | −200 | 20 | 1.95 | 77 | 50 | 1.90 | 200 | 1.90 |
| Comparative Example 46 | 400 | CW | −200 | 100 | 1.95 | 77 | 100 | 1.90 | 200 | 1.90 |
| Comparative Example 47 | 400 | CW | −200 | 50 | 1.95 | 77 | 20 | 1.90 | 200 | 1.90 |
| Comparative Example 48 | 400 | CW | −200 | 50 | 1.95 | 77 | 50 | 1.50 | 200 | 1.90 |
| Comparative Example 49 | 400 | CW | −200 | 50 | 1.95 | 77 | 50 | 1.70 | 200 | 1.90 |
| Comparative Example 50 | 400 | CW | −200 | 50 | 1.95 | 77 | 50 | 2.0 | 200 | 1.90 |
| Comparative Example 51 | 400 | CW | −200 | 50 | 1.95 | 77 | 50 | 1.90 | 100 | 1.90 |
| Comparative Example 52 | 400 | CW | −200 | 50 | 1.95 | 77 | 50 | 1.90 | 200 | 1.50 |
| Comparative Example 53 | 400 | CW | −200 | 50 | 1.95 | 77 | 50 | 1.90 | 200 | 1.70 |
| Comparative Example 54 | 400 | CW | −200 | 50 | 1.95 | 77 | 50 | 1.90 | 200 | 2.00 |
| Comparative Example 55 | 400 | CW | −200 | 50 | 1.95 | 77 | 50 | 1.90 | 200 | 1.90 |
| Comparative Example 56 | 400 | CW | −200 | 50 | 1.95 | 77 | 50 | 1.90 | 200 | 1.90 |
| Comparative Example 57 | | | | | | | | | | |
| Comparative Example 58 | — | — | — | — | — | — | — | — | — | — |
| Comparative Example 59 | — | — | — | — | — | — | 50 | 1.90 | 200 | 1.90 |
| Comparative Example 60 | 400 | CW | −200 | 50 | 1.95 | 77 | — | — | 200 | 1.90 |
| Comparative Example 61 | 400 | CW | −200 | 50 | 1.95 | 77 | 50 | 1.90 | | |
| Comparative Example 62 | 400 | CW | −200 | 50 | 1.95 | 77 | 50 | $SiO_2$ deposition | 200 | 1.90 |
| Comparative Example 63 | 400 | CW | −200 | 50 | 1.95 | 77 | 50 | 1.90 | 200 | $SiO_2$ deposition |
| Comparative Example 64 | 400 | CW | −200 | 50 | 1.95 | 77 | 50 | $SiO_2$ deposition | 200 | 1.90 |
| Comparative Example 65 | 400 | CW | −200 | 50 | 1.95 | 77 | 50 | 1.90 | 200 | $SiO_2$ deposition |

| | Liquid Lubricant Name of Material | Still −1 dB (min) | Still −5 dB (min) | Scratch (mN) | Corrosion Resistance (%) | Initial Friction (μ) | Durable Friction 200 passes (μ) | Electro-magnetic Characteristics |
|---|---|---|---|---|---|---|---|---|
| Example 58 | polar PFPE | 90 | 120 | 80 | 1 | 0.25 | 0.40 | ○ |
| Example 59 | polar PFPE | 90 | 120 | 80 | 1 | 0.25 | 0.40 | ○ |
| Example 60 | polar PFPE | 100 | >120 | 80 | 1 | 0.25 | 0.40 | ○ |
| Example 61 | polar PFPE | 100 | >120 | 80 | 1 | 0.25 | 0.40 | ○ |
| Example 62 | polar PFPE | >120 | >120 | 120 | 1 | 0.15 | 0.20 | ○ |
| Example 63 | polar PFPE | >120 | >120 | 120 | 1 | 0.15 | 0.20 | ○ |
| Example 64 | polar PFPE | >120 | >120 | 120 | 1 | 0.15 | 0.20 | ○ |
| Example 65 | polar PFPE | >120 | >120 | 120 | 1 | 0.15 | 0.20 | ○ |
| Example 66 | polar PFPE | 90 | 120 | 80 | 1 | 0.25 | 0.40 | ○ |
| Example 67 | polar PFPE | 100 | >120 | 80 | 1 | 0.25 | 0.40 | ○ |
| Example 68 | polar PFPE | 90 | 120 | 80 | 1 | 0.25 | 0.40 | ○ |
| Example 69 | polar PFPE | 90 | 120 | 80 | 1 | 0.25 | 0.40 | ○ |
| Example 70 | polar PFPE | 90 | 120 | 80 | 1 | 0.25 | 0.40 | ○ |
| Example 71 | polar PFPE | 90 | 120 | 80 | 1 | 0.25 | 0.40 | ○ |
| Example 72 | polar PFPE | 70 | 100 | 75 | 5 | 0.25 | 0.45 | ○ |
| Example 73 | polar PFPE | 90 | 120 | 80 | 1 | 0.25 | 0.40 | ○ |
| Example 74 | polar PFPE | 90 | 120 | 80 | 1 | 0.25 | 0.40 | ○ |
| Example 75 | polar PFPE | 90 | 120 | 80 | 1 | 0.25 | 0.40 | ○ |
| Example 76 | non-polar PFPE | 90 | 120 | 80 | 1 | 0.25 | 0.40 | ○ |
| Example 77 | PFA | 90 | 120 | 80 | 1 | 0.20 | 0.40 | ○ |
| Example 78 | phosphazene | 90 | 120 | 80 | 1 | 0.25 | 0.38 | ○ |
| Example 79 | non-polar PFPE | >120 | >120 | 80 | 1 | 0.15 | 0.20 | ○ |
| Example 80 | PFA | >120 | >120 | 80 | 1 | 0.15 | 0.20 | ○ |
| Example 81 | phosphazene | >120 | >120 | 80 | 1 | 0.15 | 0.20 | ○ |
| Example 82 | FA108 | 90 | 120 | 80 | 1 | 0.25 | 0.40 | ○ |

TABLE 4-continued

| | | | | | | | | |
|---|---|---|---|---|---|---|---|---|
| Example 83 | alkylate | 90 | 120 | 80 | 1 | 0.20 | 0.40 | o |
| Example 84 | polar PFPE | 90 | 120 | 80 | 1 | 0.25 | 0.40 | o |
| Example 85 | polar PFPE | 90 | >120 | 80 | 1 | 0.25 | 0.40 | o |
| Comparative Example 37 | polar PFPE | 0.5 | 1 | 10 | 13 | 0.50 | 0.85 | o |
| Comparative Example 38 | polar PFPE | 3 | 5 | 20 | 10 | 0.35 | 0.80 | o |
| Comparative Example 39 | polar PFPE | 3 | 5 | 25 | 10 | 0.32 | 0.60 | o |
| Comparative Example 40 | polar PFPE | 3 | 5 | 20 | 10 | 0.30 | 0.50 | o |
| Comparative Example 41 | polar PFPE | 1 | 2 | 15 | 12 | 0.35 | 0.80 | o |
| Comparative Example 42 | polar PFPE | 3 | 5 | 20 | 10 | 0.30 | 0.50 | o |
| Comparative Example 43 | polar PFPE | 3 | 5 | 20 | 10 | 0.30 | 0.50 | o |
| Comparative Example 44 | polar PFPE | 3 | 5 | 20 | 10 | 0.30 | 0.50 | o |
| Comparative Example 45 | polar PFPE | 3 | 5 | 20 | 10 | 0.35 | 0.60 | o |
| Comparative Example 46 | polar PFPE | 100 | >120 | 80 | 1 | 0.25 | 0.40 | x |
| Comparative Example 47 | polar PFPE | 30 | 45 | 40 | 5 | 0.25 | 0.60 | o |
| Comparative Example 48 | polar PFPE | 3 | 5 | 20 | 12 | 0.25 | 0.60 | o |
| Comparative Example 49 | polar PFPE | 3 | 5 | 25 | 11 | 0.25 | 0.50 | o |
| Comparative Example 50 | polar PFPE | 1 | 2 | 15 | 15 | 0.25 | 0.65 | o |
| Comparative Example 51 | polar PFPE | 30 | 45 | 35 | 17 | 0.25 | 0.55 | o |
| Comparative Example 52 | polar PFPE | 5 | 10 | 20 | 17 | 0.25 | 0.65 | o |
| Comparative Example 53 | polar PFPE | 5 | 10 | 25 | 15 | 0.25 | 0.60 | o |
| Comparative Example 54 | polar PFPE | 3 | 5 | 20 | 17 | 0.25 | 0.80 | o |
| Comparative Example 55 | fatty acid | 1 | 2 | 80 | 1 | 0.35 | 100 passes stop | o |
| Comparative Example 56 | silicone oil | 1 | 2 | 80 | 1 | 0.40 | 100 passes stop | o |
| Comparative Example 57 | — | 0.5 | 0.5 | — | 25 | 0.50 | unmeasurable | o |
| Comparative Example 58 | polar PFPE | 0.5 | 0.5 | — | 25 | 0.30 | 0.60 | o |
| Comparative Example 59 | polar PFPE | 3 | 5 | 20 | 10 | 0.30 | 0.50 | o |
| Comparative Example 60 | polar PFPE | 3 | 5 | 20 | 5 | 0.30 | 0.50 | o |
| Comparative Example 61 | polar PFPE | 30 | 45 | 20 | 10 | 0.25 | 0.60 | o |
| Comparative Example 62 | polar PFPE | 5 | 20 | 20 | 10 | 0.30 | 100 passes stop | o |
| Comparative Example 63 | polar PFPE | 5 | 20 | 20 | 10 | 0.30 | 100 passes stop | o |
| Comparative Example 64 | polar PFPE | 10 | 30 | 20 | 10 | 0.30 | 150 passes stop | o |
| Comparative Example 65 | polar PFPE | 10 | 30 | 20 | 10 | 0.30 | 150 passes stop | o |

EXAMPLES 86 TO 107

SiOx (x=1.900) was plasma polymerized using a mixture of tetramethoxysilane and oxygen at a discharge frequency of 400 kHz to form an undercoat layer on a polyethylene terephthalate film substrate having a thickness of 71 μm, and an alloy containing 80% by weight of Co and 20% by weight of Ni was deposited thereon under an oxygen atmosphere to form a ferromagnetic metal layer (with a film thickness of 1,500 Å). Then, SiOx (x=1.900) was plasma polymerized to form an intercepting layer, and each of the various hydrocarbons shown in Tables 5-1 and 5-2 was plasma polymerized thereon to form a protective layer. Further, using a polar perfluoropolyether (PFPE) as a liquid lubricant, a lubricating layer was formed. The film thickness of the intercepting layers, the kinds of hydrocarbons, the plasma frequency and the bias on film formation, and the film thickness, the refractive index and the contact angle of the resulting protective layers are shown in Tables 5-1 and 5-2, and the film thickness of the SiOx undercoat layers is shown in Tables 5-3 and 5-4. Further, for the resulting magnetic recording tapes, the still time, the corrosion resistance, the initial friction, the durable friction and the results of surface observation are shown in Tables 5-3 and 5-4.

The film thickness, the refractive index, the composition of SiOx and the contact angle were measured in the same manner as with Examples 38 to 61.

TABLE 5

| | Protective Film (DLC Film) | | | | | | | Intercepting Film (SiOx) | |
|---|---|---|---|---|---|---|---|---|---|
| | Plasma Frequency (kHz) | Bias | Bias V | Film Thickness (Å) | Refractive Index | Contact Angle | Raw Material Gas | Film Thickness (Å) | Value of x |
| Example 86 | 400 | CW | −200 | 50 | 1.95 | 77 | methane/H2 | 50 | 1.90 |
| Example 87 | 400 | pulse | −200 | 50 | 1.97 | 75 | methane/H2 | 50 | 1.90 |
| Example 88 | 400 | CW | −200 | 50 | 1.95 | 77 | ethane | 50. | 1.90 |
| Example 89 | 400 | CW | −200 | 50 | 1.95 | 77 | ethane/H2 | 50 | 1.90 |
| Example 90 | 400 | pulse | −200 | 50 | 1.97 | 75 | ethane | 50 | 1.90 |
| Example 91 | 400 | pulse | −200 | 50 | 1.97 | 75 | ethane/H2 | 50 | 1.90 |
| Example 92 | 400 | CW | −200 | 50 | 1.95 | 77 | propane | 50 | 1.90 |
| Example 93 | 400 | CW | −200 | 50 | 1.95 | 77 | propane/H2 | 50 | 1.90 |
| Example 94 | 400 | pulse | −200 | 50 | 1.97 | 75 | propane | 50 | 1.90 |
| Example 95 | 400 | pulse | −200 | 50 | 1.97 | 75 | propane/H2 | 50 | 1.90 |
| Example 96 | 400 | CW | −200 | 50 | 1.95 | 77 | butane | 50 | 1.90 |
| Example 97 | 400 | CW | −200 | 50 | 1.95 | 77 | butane/H2 | 50 | 1.90 |
| Example 98 | 400 | pulse | −200 | 50 | 1.97 | 75 | butane | 50 | 1.90 |
| Example 99 | 400 | pulse | −200 | 50 | 1.99 | 75 | butane/H2 | 50 | 1.90 |
| Example 100 | 400 | CW | −200 | 50 | 1.97 | 76 | ethylene | 50 | 1.90 |
| Example 101 | 400 | CW | −200 | 50 | 1.97 | 76 | ethylene/H2 | 50 | 1.90 |
| Example 102 | 400 | pulse | −200 | 50 | 2.0 | 74 | ethylene | 50 | 1.90 |
| Example 103 | 400 | pulse | −200 | 50 | 2.0 | 74 | ethylene/H2 | 50 | 1.90 |
| Example 104 | 400 | CW | −200 | 50 | 1.97 | 76 | acetylene | 50 | 1.90 |
| Example 105 | 400 | CW | −200 | 50 | 1.97 | 76 | acetylene/H2 | 50 | 1.90 |
| Example 106 | 400 | pulse | −200 | 50 | 2.0 | 74 | acetylene | 50 | 1.90 |
| Example 107 | 400 | pulse | −200 | 50 | 2.0 | 74 | acetylene/H2 | 50 | 1.90 |

| | Undercoat layer (SiOx) | | | | | | Corrosion | | Durable |
|---|---|---|---|---|---|---|---|---|---|
| | Film Thickness (Å) | Value of x | Liquid Lubricant Name of Material | Still −1 dB (min) | Still −5 dB (min) | Scratch (mN) | Resistance (%) | Initial Friction (μ) | Friction 200 passes (μ) |
| Example 86 | 200 | 1.90 | polar PFPE | 100 | >120 | 80 | 1 | 0.15 | 0.20 |
| Example 87 | 200 | 1.90 | polar PFPE | >120 | >120 | 80 | 1 | 0.15 | 0.20 |
| Example 88 | 200 | 1.90 | polar PFPE | 100 | >120 | 80 | 1 | 0.15 | 0.20 |
| Example 89 | 200 | 1.90 | polar PFPE | 100 | >120 | 80 | 1 | 0.15 | 0.20 |
| Example 90 | 200 | 1.90 | polar PFPE | >120 | >120 | 80 | 1 | 0.15 | 0.20 |
| Example 91 | 200 | 1.90 | polar PFPE | >120 | >120 | 80 | 1 | 0.15 | 0.20 |
| Example 92 | 200 | 1.90 | polar PFPE | 100 | >120 | 80 | 1 | 0.15 | 0.20 |
| Example 93 | 200 | 1.90 | polar PFPE | 100 | >120 | 80 | 1 | 0.15 | 0.20 |
| Example 94 | 200 | 1.90 | polar PFPE | >120 | >120 | 80 | 1 | 0.15 | 0.20 |
| Example 95 | 200 | 1.90 | polar PFPE | >120 | >120 | 80 | 1 | 0.15 | 0.20 |
| Example 96 | 200 | 1.90 | polar PFPE | 100 | >120 | 80 | 1 | 0.15 | 0.20 |
| Example 97 | 200 | 1.90 | polar PFPE | 100 | >120 | 80 | 1 | 0.15 | 0.20 |
| Example 98 | 200 | 1.90 | polar PFPE | >120 | >120 | 80 | 1 | 0.15 | 0.20 |
| Example 99 | 200 | 1.90 | polar PFPE | >120 | >120 | 80 | 1 | 0.15 | 0.20 |
| Example 100 | 200 | 1.90 | polar PFPE | >120 | >120 | 80 | 1 | 0.15 | 0.20 |
| Example 101 | 200 | 1.90 | polar PFPE | >120 | >120 | 80 | 1 | 0.15 | 0.20 |
| Example 102 | 200 | 1.90 | polar PFPE | >120 | >120 | 80 | 1 | 0.15 | 0.20 |
| Example 103 | 200 | 1.90 | polar PFPE | >120 | >120 | 80 | 1 | 0.15 | 0.20 |
| Example 104 | 200 | 1.90 | polar PFPE | >120 | >120 | 80 | 1 | 0.15 | 0.20 |
| Example 105 | 200 | 1.90 | polar PFPE | >120 | >120 | 80 | 1 | 0.15 | 0.20 |
| Example 106 | 200 | 1.90 | polar PFPE | >120 | >120 | 80 | 1 | 0.15 | 0.20 |
| Example 107 | 200 | 1.90 | polar PFPE | >120 | >120 | 80 | 1 | 0.15 | 0.20 |

EXAMPLES 108 TO 122 AND COMPARATIVE EXAMPLES 66 TO 72

Magnetic recording media were produced in the same manner as with the above-mentioned Examples, with the exception that CW and a pulse bias were used as the negative bias, and the pulse frequency Hz, the flow ratio of $CH_4/H$ and the pulse ratio ON/OFF were variously changed. The pulse ratio was changed by setting the ON/OFF time with a setting switch attached to a power supply.

Results are shown in the following Tables 6-1 to 6-4.

TABLE 6

| | Plasma Frequency (kHz) | Bias | Bias V | Flow Ratio (CH$_4$/H$_2$) | Pulse Ratio (ON/OFF) | Pulse Frequency Hz | Film Thickness (Å) | Refractive Index | Contact Angle |
|---|---|---|---|---|---|---|---|---|---|
| Example 108 | 400 | CW | −200 | 1/3 | — | — | 50 | 1.95 | 77 |
| Example 109 | 400 | CW | −200 | 1/2 | — | — | 50 | 1.95 | 77 |
| Example 110 | 400 | CW | −200 | 2/1 | — | — | 50 | 1.95 | 77 |
| Example 111 | 400 | CW | −200 | 3/1 | — | — | 50 | 1.95 | 77 |
| Example 112 | 400 | pulse | −200 | 1/1 | 1/3 | 50 | 50 | 1.95 | 77 |
| Example 113 | 400 | pulse | −200 | 1/1 | 1/2 | 50 | 50 | 1.95 | 77 |
| Example 114 | 400 | pulse | −200 | 1/1 | 2/1 | 50 | 50 | 1.95 | 77 |
| Example 115 | 400 | pulse | −200 | 1/1 | 3/1 | 50 | 50 | 1.95 | 77 |
| Example 116 | 400 | pulse | −200 | 1/1 | 1/1 | 10 | 50 | 1.95 | 77 |
| Example 119 | 400 | pulse | −200 | 1/1 | 1/1 | 20 | 50 | 1.95 | 77 |
| Example 118 | 400 | pulse | −200 | 1/1 | 1/1 | 100 | 50 | 1.95 | 77 |
| Example 119 | 400 | pulse | −200 | 1/1 | 1/1 | 200 | 50 | 1.95 | 77 |
| Example 120 | 400 | pulse | −200 | 1/1 | 1/1 | 300 | 50 | 1.95 | 77 |
| Ekample 121 | 400 | pulse | −200 | 1/1 | 1/1 | 400 | 50 | 1.95 | 77 |
| Example 122 | 400 | pulse | −200 | 1/1 | 1/1 | 500 | 50 | 1.95 | 77 |
| Comparative Example 66 | 400 | CW | −200 | 1/4 | — | — | 50 | 1.88 | 80 |
| Comparative Example 67 | 400 | CW | −200 | 4/1 | — | — | 50 | 1.9 | 80 |
| Comparative Example 68 | 400 | pulse | −200 | 1/1 | 4/1 | 50 | 50 | 1.88 | 77 |
| Comparative Example 69 | 400 | pulse | −200 | 1/1 | 1/4 | 50 | 50 | 1.85 | 82 |
| Comparative Example 70 | 400 | pulse | −200 | 1/1 | 1/1 | 5 | 50 | 1.88 | 80 |
| Comparative Example 71 | 400 | pulse | −200 | 1/1 | 1/1 | 600 | 50 | 1.8 | 81 |
| Comparative Example 72 | 400 | pulse | −200 | 1/1 | 1/1 | 1000 | 50 | 1.8 | 81 |

| | Still −1 dB (min) | Still −5 dB (min) | Corrosion Resistance (%) | Initial Friction (μ) | Durable Friction 200 passes (μ) | Scratch (mN) | Electromagnetic Characteristics |
|---|---|---|---|---|---|---|---|
| Example 108 | 120 | 90 | 3 | 0.25 | 0.34 | 80 | o |
| Example 109 | 120 | 90 | 3 | 0.25 | 0.34 | 80 | o |
| Example 110 | 120 | 90 | 3 | 0.25 | 0.34 | 80 | o |
| Example 111 | 120 | 90 | 3 | 0.25 | 0.34 | 80 | o |
| Example 112 | >120 | 120 | 2 | 0.2 | 0.35 | 90 | o |
| Example 113 | >120 | 120 | 2 | 0.2 | 0.34 | 100 | o |
| Example 114 | >120 | 120 | 2 | 0.2 | 0.35 | 120 | o |
| Example 115 | >120 | 120 | 2 | 0.2 | 0.35 | 120 | o |
| Example 116 | >120 | 120 | 2 | 0.2 | 0.35 | 90 | o |
| Example 117 | >120 | 120 | 2 | 0.2 | 0.35 | 100 | o |
| Example 118 | >120 | 120 | 2 | 0.2 | 0.35 | 120 | o |
| Example 119 | >120 | 120 | 2 | 0.2 | 0.35 | 120 | o |
| Example 120 | >120 | 120 | 2 | 0.2 | 0.35 | 120 | o |
| Example 121 | >120 | 120 | 2 | 0.2 | 0.35 | 120 | o |
| Example 122 | >120 | 120 | 2 | 0.2 | 0.35 | 120 | o |
| Comparative Example 66 | 30 | 10 | 5 | 0.3 | 0.7 | 25 | x |
| Comparative Example 67 | 30 | 10 | 10 | 0.3 | 0.5 | 25 | x |
| Comparative Example 68 | 10 | 30 | 10 | 0.25 | 0.55 | 25 | x |
| Comparative Example 69 | 30 | 5 | 10 | 0.3 | 0.7 | 20 | x |
| Comparative Example 70 | 20 | 10 | 5 | 0.3 | 0.7 | 20 | x |
| Comparative Example 71 | 20 | 5 | 10 | 0.32 | 0.6 | 20 | x |
| Comparative Example 72 | 20 | 5 | 10 | 0.32 | 0.6 | 20 | x |

In the magnetic recording medium of the present invention having the ferromagnetic metal layer serving as the magnetic layer, the specified silicon oxide films are used as the undercoat layer and the insulating layer for the magnetic layer, the plasma-polymerized hydrogen-containing carbon film, plasma polymerized under the specified applying conditions and having the specified characteristics, is used as the protective layer, and the lubricating layer is formed of the specified fluorine compound, thereby providing the magnetic recording medium with excellent electromagnetic characteristics, corrosion resistance, durability, abrasion resistance and lubricity.

By the combination of the foregoing and the contact angle of the protective, as formed, being less than 80°, as set forth in the following claims, the present invention has excellent effect in the still durability. This is shown in Table 1, especially Tables 1-6 to 1-10, and Comparative Examples 2 to 9. In addition to the still durability, the present invention has better effect in initial friction and durable friction as compared to a magnetic recording tape whose contact angle is 80° or more, as shown in Comparative Examples 2 to 9.

What is claimed is:

1. A magnetic recording medium comprising a non-magnetic substrate, an undercoat layer, a ferromagnetic metal layer, a protective layer and a lubricating layer formed in this order on the substrate, wherein the protective layer is a plasma-polymerized hydrogen-containing carbon film having, as formed, a refractive index of 1.90 or more, a film thickness of 30 to 150 Å and a contact angle with ion exchanged water of less than 80 degrees, the undercoat layer is a film formed of silicon oxide represented by SiOx (x=1.8–1.95), and the lubricating layer is formed of a compound selected from the group consisting of polar perfluoropolyethers, non-polar perfluoropolyethers, perfluorocarboxylic acids, phosphazens, perfluoroalkylates and perfluoroacrylate compounds.

2. A magnetic recording medium comprising a non-magnetic substrate, an undercoat layer, a ferromagnetic metal layer, an intercepting layer, a protective layer and a lubricating layer formed in this order on the substrate, wherein the protective layer is a plasma-polymerized hydrogen-containing carbon film (DLC film) having, as formed, a refractive index of 1.90 or more and a contact angle with ion exchanged water of less than 80 degrees, the undercoat layer and the intercepting layer are films formed of silicon oxide represented by SiOx (x=1.8–1.95), the total film thickness of the protective layer and the intercepting layer is 30 to 150 Å, and the lubricating layer is formed of a compound selected from the group consisting of polar perfluoropolyethers, non-polar perfluoropolyethers, perfluorocarboxylic acids, phosphazens, perfluoroalkylates and perfluoroacrylate compounds.

3. The magnetic recording medium according to claim 1 or 2, wherein the ferromagnetic metal layer is formed by vapor deposition.

4. A method for producing a magnetic recording medium according to claim 1 which comprises forming an undercoat layer of silicon oxide represented by SiOx (x=1.8–1.95) on a non-magnetic substrate, forming a ferromagnetic metal layer thereon in a vapor phase, then plasma polymerizing a hydrocarbon gas and hydrogen at a frequency of 50 kHz to 450 kHz while applying a negative bias to a base side to form a protective layer of a hydrogen-containing carbon film having, as formed, a refractive index of 1.90 or more, a contact angle with ion exchanged water of less than 80 degrees and a film thickness of 30 to 150 Å, and finally forming a lubricating layer of a compound selected from the group consisting of polar perfluoropolyethers, non-polar perfluoropolyethers, perfluorocarboxylic acids, phosphazens, perfluoroalkylates and perfluoroacrylate compounds.

5. A method for producing a magnetic recording medium according to claim 2 which comprises forming an undercoat layer of silicon oxide represented by SiOx (x=1.8–1.95) on a non-magnetic substrate, forming a ferromagnetic metal layer thereon in a vapor phase, forming an intercepting layer of a film formed of silicon oxide represented by SiOx (x=1.8–1.95) by plasma polymerization, then plasma polymerizing a hydrocarbon gas and hydrogen at a frequency of 50 kHz to 450 kHz while applying a negative bias to a base side to form a protective layer of a hydrogen-containing carbon film having, as formed, a refractive index of 1.90 or more and a contact angle with ion exchanged water of less than 80 degrees, adjusting the total film thickness of the protective layer and the intercepting layer to 30 to 150 Å, and finally forming a lubricating layer of a compound selected from the group consisting of polar perfluoropolyethers, non-polar perfluoropolyethers, perfluorocarboxylic acids, phosphazens, perfluoroalkylates and perfluoroacrylate compounds.

6. The method according to claim 4 or 5, wherein the negative bias is a pulse bias, the pulse duty factor (ON/OFF ratio) is 0.3 to 3, and the frequency is 10 Hz to 500 Hz.

7. The method according to claim 4 or 5, wherein the formation of the ferromagnetic metal layer in the vapor phase is by vapor deposition.

* * * * *